(12) United States Patent
Maruyama et al.

(10) Patent No.: US 11,931,933 B2
(45) Date of Patent: Mar. 19, 2024

(54) INJECTION MOLDING SYSTEM

(71) Applicant: Seiko Epson Corporation, Tokyo (JP)

(72) Inventors: Hidenobu Maruyama, Azumino (JP); Kazunobu Maruyama, Shiojiri (JP); Masato Sugano, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 201 days.

(21) Appl. No.: 17/402,880

(22) Filed: Aug. 16, 2021

(65) Prior Publication Data

US 2022/0055268 A1    Feb. 24, 2022

(30) Foreign Application Priority Data

Aug. 19, 2020 (JP) .................... 2020-138508

(51) Int. Cl.
| | |
|---|---|
| *B29C 45/04* | (2006.01) |
| *B29C 45/00* | (2006.01) |
| *B29C 45/17* | (2006.01) |
| *B29C 45/40* | (2006.01) |
| *B29C 45/60* | (2006.01) |
| *B29C 45/62* | (2006.01) |

(52) U.S. Cl.
CPC ...... *B29C 45/0416* (2013.01); *B29C 45/1769* (2013.01); *B29C 45/401* (2013.01); *B29C 45/60* (2013.01); *B29C 45/62* (2013.01); *B29C 2045/0096* (2013.01); *B29C 2945/76531* (2013.01)

(58) Field of Classification Search
CPC .... B29C 2045/4283; B29C 2045/0096; B29C 2045/4068; B29C 45/0416
See application file for complete search history.

(56) References Cited

U.S. PATENT DOCUMENTS

| | | | |
|---|---|---|---|
| 4,781,571 A * | 11/1988 | Heindl ............... | B29C 45/42 425/444 |
| 6,296,472 B1 * | 10/2001 | Ito .................... | B29C 45/17 425/589 |
| 6,322,343 B1 * | 11/2001 | Yoda ................. | B29C 45/17 425/150 |

(Continued)

FOREIGN PATENT DOCUMENTS

| | | |
|---|---|---|
| CN | 1933955 | 3/2007 |
| CN | 103831927 | 5/2014 |

(Continued)

*Primary Examiner* — Alison L Hindenlang
*Assistant Examiner* — Virak Nguon
(74) *Attorney, Agent, or Firm* — WORKMAN NYDEGGER

(57) ABSTRACT

An injection molding system includes a first unit in which an injection molding machine is disposed and an option unit. The injection molding machine is configured to be attachable with a stationary die and a movable die that moves with respect to the stationary die. The option unit includes at least one of a second unit in which a robot that moves a molded article molded by the injection molding machine is disposed and a third unit in which at least one of a material dryer that dries a material supplied to the injection molding machine and a material supply section that supplies the material to the injection molding machine is disposed. The first unit is configured to be detachably attachable with the option unit.

11 Claims, 6 Drawing Sheets

(56) References Cited

U.S. PATENT DOCUMENTS

| | | | |
|---|---|---|---|
| 2007/0184146 A1 | 8/2007 | Takeuchi | |
| 2012/0227242 A1* | 9/2012 | Wenzin | B29C 45/1761 29/428 |
| 2013/0259962 A1* | 10/2013 | Sato | B29C 45/80 425/150 |
| 2016/0311143 A1* | 10/2016 | Yoshioka | B29C 45/1761 |
| 2016/0346979 A1 | 12/2016 | Uchiyama | |
| 2017/0136671 A1 | 5/2017 | Uchiyama | |

FOREIGN PATENT DOCUMENTS

| | | |
|---|---|---|
| CN | 206501316 | 9/2017 |
| CN | 110076956 | 8/2019 |
| CN | 110884045 A * | 3/2020 |
| EP | 2735418 | 5/2014 |
| JP | H07-205184 | 8/1995 |
| JP | 2005-014224 | 1/2005 |
| JP | 2008-284768 | 11/2008 |
| JP | 2009-214438 | 9/2009 |
| JP | 2011-020378 | 2/2011 |
| JP | 2014-226846 | 12/2014 |
| JP | 2016-215557 | 12/2016 |
| JP | 2017-087689 | 5/2017 |

\* cited by examiner

INJECTION MOLDING SYSTEM

The present application is based on, and claims priority from JP Application Serial Number 2020-138508, filed Aug. 19, 2020, the disclosure of which is hereby incorporated by reference herein in its entirety.

BACKGROUND

1. Technical Field

The present disclosure relates to an injection molding system.

2. Related Art

Concerning an injection molding system, JP-A-2017-87689 (Patent Literature 1) discloses a system including a plurality of molding cells coupled to a management device via a network. Each of the molding cells includes an injection molding machine, a temperature controlling machine that adjusts the temperature of a mold, an imaging device that images a molded article, and a robot that takes out the molded article. The configurations of the molding cells are customizable. For example, a configuration including a molded article taking-out device replacing the robot, a configuration including a molded article measuring device, and a configuration not including a molded article imaging device are conceivable.

Patent Literature 1 states that the devices configuring the molding cell are coupled by a communication line but does not particularly refer to physical disposition of the devices. In recent years, there have been demands for a reduction in the size of manufacturing equipment. In the injection molding system including the plurality of devices concerning injection molding as explained above, there have also been demands for a technique capable of realizing space saving while improving flexibility of customization.

SUMMARY

According to a first aspect of the present disclosure, an injection molding system is provided. The injection molding system includes: a first unit in which an injection molding machine is disposed; and an option unit. The injection molding machine is configured to be attachable with a stationary die and a movable die that moves with respect to the stationary die. The option unit includes at least one of: a second unit in which a robot that moves a molded article molded by the injection molding machine is disposed; and a third unit in which at least one of a material dryer that dries a material supplied to the injection molding machine and a material supply section that supplies the material to the injection molding machine is disposed. The first unit is configured to be detachably attachable with the option unit.

DESCRIPTION OF EXEMPLARY EMBODIMENTS

A. First Embodiment

Figure 1:
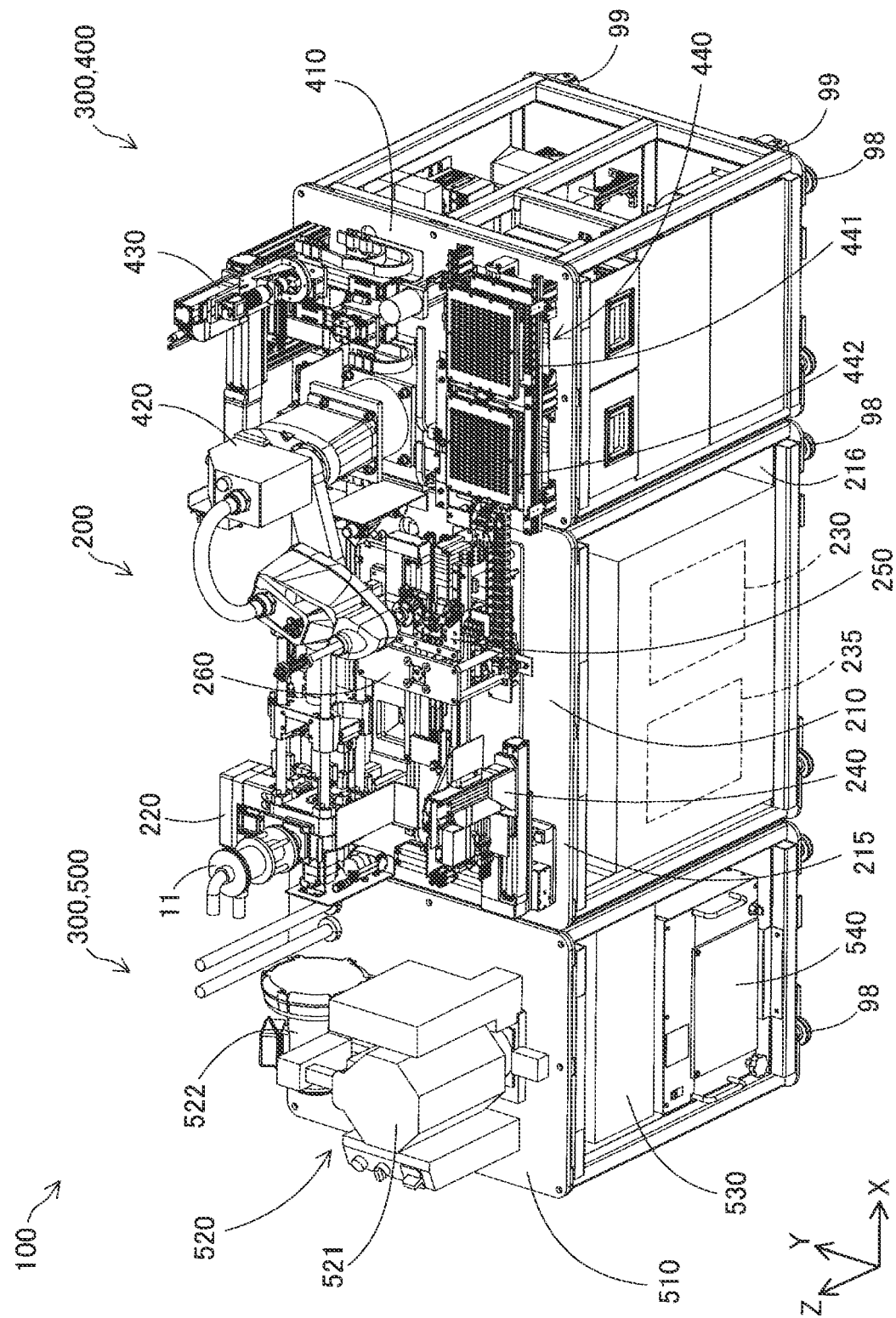
FIG. 1 is a perspective view of an injection molding system.
Figure 2:
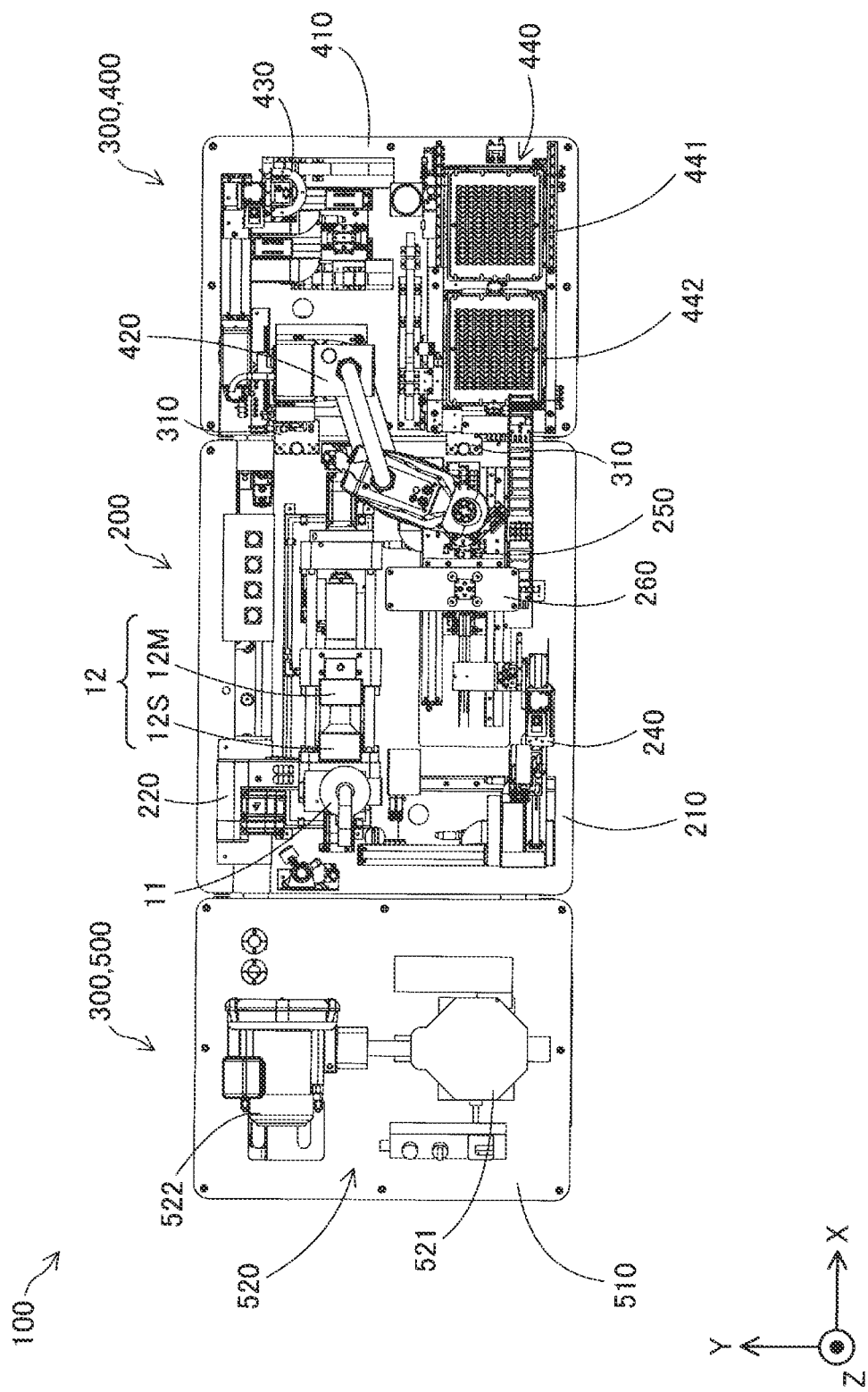
FIG. 2 is a plan view of the injection molding system.

FIG. 1 is a perspective view of an injection molding system 100 in a first embodiment. FIG. 2 is a plan view of the injection molding system 100. In FIG. 1, X, Y, and Z directions orthogonal to one another are shown. In this embodiment, when the injection molding system 100 is viewed from the front, a +Y direction is the depth direction and a −Y direction is the direction on the near side. When the injection molding system 100 is viewed from the front, +X direction is the right direction and a −X direction is the left direction. A −Z direction is the vertical direction and a +Z direction is the upward direction. The directions shown in FIG. 1 correspond to directions shown in FIG. 2 and the subsequent figures.

As shown in FIGS. 1 and 2, the injection molding system 100 includes a first unit 200 and an option unit 300. In this embodiment, the option unit 300 includes a second unit 400 and a third unit 500. In this embodiment, the second unit 400 is disposed on the +X direction side with respect to the first unit 200. The third unit 500 is disposed on the −X direction side with respect to the first unit 200. That is, the first unit 200 is disposed between the second unit 400 and the third unit 500 to be sandwiched by the second unit 400 and the third unit 500. In the following explanation, when the second unit 400 and the third unit 500 are not particularly distinguished, these units are simply referred to as option unit 300.

The first unit 200 is configured to be detachably attachable with the option unit 300. In this embodiment, at least one of the second unit 400 and the third unit 500 is detachably attachable to the first unit 200. In this embodiment, as shown in FIG. 2, a plate-like member 310 for coupling is bridged between the first unit 200 and the second unit 400 and the plate-like member 310 is fastened to the first unit 200 and the second unit 400 by a bolt, whereby the second unit 400 is detachably coupled to the first unit 200. A pipe included in the third unit 500 is coupled to the first unit 200, whereby the third unit 500 is detachably coupled to the first unit 200. Coupling means for detachably coupling the option unit 300 to the first unit 200 is not limited to the bolt and the pipe. A fastener such as a clamp or various metal fittings may be used.

As shown in FIG. 1, the first unit 200 and the option unit 300 respectively include wheels 99. In a state in which the first unit 200 and the option unit 300 are not coupled, the units are capable of moving independently from one another. Bolt-type stoppers 98 are provided near the wheels 99 of the units. A user can fix the units or the injection molding system 100 in any setting place using the stoppers 98.

Upper parts of the first unit 200, the second unit 400, and the third unit 500 may be covered by a not-shown cover. The cover prevents foreign matters such as dust from intruding into the injection molding system 100. At least a part of the cover is preferably made of transparent glass or resin such that a work state on the inside of the cover can be visually recognized from the outside. A door for performing maintenance or an opening for ventilation may be provided in the cover.

The first unit 200 includes a first housing 210, an injection molding machine 220, a controller 230, a molding die temperature controller 235, a taking-out device 240, a transporting device 250, and a gate cut device 260. As shown in FIG. 1, the first housing 210 includes a first base 215 and a second base 216 located vertically below the first base 215. The injection molding machine 220, the taking-out device 240, the transporting device 250, and the gate cut device 260 are disposed on the first base 215. The controller 230 and the molding die temperature controller 235 are disposed on the second base 216. That is, in the first unit 200, the injection molding machine 220 and the controller 230 are disposed side by side in the vertical direction.

As shown in FIG. 2, the injection molding machine 220 is configured to be attachable with a molding die 12. In FIG. 1, the molding die 12 is omitted. The injection molding machine 220 is a device that ejects and injects a melted material into the molding die 12 to mold a molded article. A hopper 11 that receives supply of the material is provided in the injection molding machine 220. The molding die 12 may be made of metal or may be made of resin. The molding die 12 is simply referred to as mold as well.

The controller 230 is a device that collectively controls the injection molding machine 220, the taking-out device 240, and the transporting device 250 and a robot 420, an inspection unit 430, and a stacking mechanism. 440 explained below. In this embodiment, the controller 230 is configured by a PLC (programmable logic controller). The controller 230 configured by the PLC controls linked operations of the devices explained above by being programmed by a language such as a ladder language.

The molding die temperature controller 235 is a temperature adjustment device for circulating a heat medium to a cooling pipe provided in the molding die 12 and keeping the temperature of the molding die 12 at constant temperature.

The taking-out device 240 is a device that takes out, from the molding die 12, a molded article molded and released by the injection molding machine 220. The taking-out device 240 is disposed on the first housing 210 on the near side, that is, the −Y-direction side of the injection molding machine 220. The taking-out device 240 is configured by a hand that grips the molded article and a linear actuator that moves the hand along the X direction and the Y direction. The taking-out device 240 takes out, with the hand, the molded article from the injection molding machine 220, moves, with the linear actuator, the molded article taken out from the injection molding machine 220 to above the end portion on the −X-direction side of the transporting device 250, and places the molded article on the transporting device 250.

The transporting device 250 is a device that transports the molded article taken out by the taking-out device 240. The transporting device 250 is disposed on the first housing 210 on the near side, that is, the −Y-direction side of the injection molding machine 220. That is, both of the taking-out device 240 and the transporting device 250 are disposed on the −Y-direction side of the injection molding machine 220. In this embodiment, the transporting device 250 is disposed adjacent to the +X-direction side of the taking-out device 240. That is, the distance between the transporting device 250 and the second unit 400 is shorter than the distance between the taking-out device 240 and the second unit 400.

In this embodiment, the transporting device 250 is configured by a linear actuator capable of moving the molded article along the X direction. The transporting device 250 moves the molded article placed on the transporting device 250 by the taking-out device 240 from the end portion on the −X-direction side toward the end portion on the +X-direction side of the transporting device 250. The gate cut device 260 that cuts a gate section and a runner remaining in the molded article is disposed on the transporting device 250. The gate section and the runner of the molded article transported on the transporting device 250 are cut by the gate cut device 260 during the transportation.

The second unit 400 includes a second housing 410, a robot 420, an inspection unit 430, and a stacking mechanism 440. The robot 420 and the inspection unit 430 are disposed on the second housing 410. The stacking mechanism 440 is provided to project upward from the inside of the second housing 410. The inspection unit 430 is disposed adjacent to the +X-direction side of the robot 420. The stacking mechanism 440 is disposed on the −Y-direction side of the robot 420 and the inspection unit 430. The second unit 400 is disposed on, with respect to the first unit 200, a movable die 12M side of a stationary die 12S and a movable die 12M included in the injection molding machine 220.

The robot 420 is a device that moves the molded article transported by the transporting device 250. In this embodiment, the robot 420 is configured as a SCARA robot. In the robot 420 in this embodiment, a controller for controlling the robot 420 is integrally incorporated. The robot 420 grips the molded article transported to the end portion in the +X-direction of the transporting device 250 by the transporting device 250 and moves the molded article to the inspection unit 430. Further, the robot 420 moves the molded article, inspection of which is completed by the inspection unit 430, to a tray on the stacking mechanism 440 and places the molded article on the tray. The robot 420 is not limited to the SCARA robot and may be configured by a vertical articulated robot having a plurality of axes.

The inspection unit 430 includes a camera for capturing an image of a molded article. The inspection unit 430 performs an appearance inspection of the molded article based on the image captured by the camera. A molded article determined as defective by the inspection unit 430 is discharged by the robot 420 to a predetermined defective product discharge region provided in the second housing 410.

The stacking mechanism 440 is a mechanism for stacking trays in which inspected molded articles transported from the inspection unit 430 by the robot 420 are stored. The stacking mechanism 440 includes a first lifting and lowering device 441 and a second lifting and lowering device 442. The robot 420 disposes a predetermined number of molded articles on a tray disposed on the first lifting and lowering device 441. When the predetermined number of molded articles is disposed on the tray, the first lifting and lowering device 441 lowers the tray. A tray disposed at the top of the second lifting and lowering device 442 is slid by a slide mechanism and disposed on the lowered tray. The movement of the tray from the second lifting and lowering device 442 to the first lifting and lowering device 441 may be performed by the robot 420. A plurality of trays are stacked on the second lifting and lowering device 442. When a tray at the top moves onto the first lifting and lowering device 441, the second lifting and lowering device 442 lifts the remaining trays. When a predetermined number of trays on which molded articles are disposed is stacked on the first lifting and lowering device 441 in this way, manufacturing of the molded articles is suspended. An operator opens a predetermined door provided in the second housing 410 to thereby take out, from the second housing 410, the trays stacked in the second housing 410 and supplies a new tray to the second lifting and lowering device 442.

The third unit 500 includes a third housing 510, a material supply device 520, a hot runner controller 530, and a heat medium temperature controller 540. The material supply device 520 is disposed on the third housing 510. The hot runner controller 530 and the heat medium temperature controller 540 are disposed in the third housing 510. In this embodiment, the heat medium temperature controller 540 is disposed below the hot runner controller 530. The third unit 500 is disposed, with respect to the first unit 200, on the stationary die 12S side of the stationary die 12S and the movable die 12M included in the injection molding machine 220.

The material supply device 520 includes a material dryer 521 and a material supply section 522. A pellet-like resin material used in the injection molding machine 220 is stored in the material dryer 521. The material stored in the material dryer 521 is dehumidified and dried in the material dryer 521 and pressure-fed to the hopper 11 included in the injection molding machine 220 by the material supply section 522 configured as a loader.

The hot runner controller 530 is a device that performs temperature adjustment of a hot runner nozzle attached to the injection molding machine 220.

The heat medium temperature controller 540 is a temperature adjusting device that cools a heat medium used by the molding die temperature controller 235. The heat medium temperature controller 540 is configured by, for example, a thermo-chiller.

Figure 3:
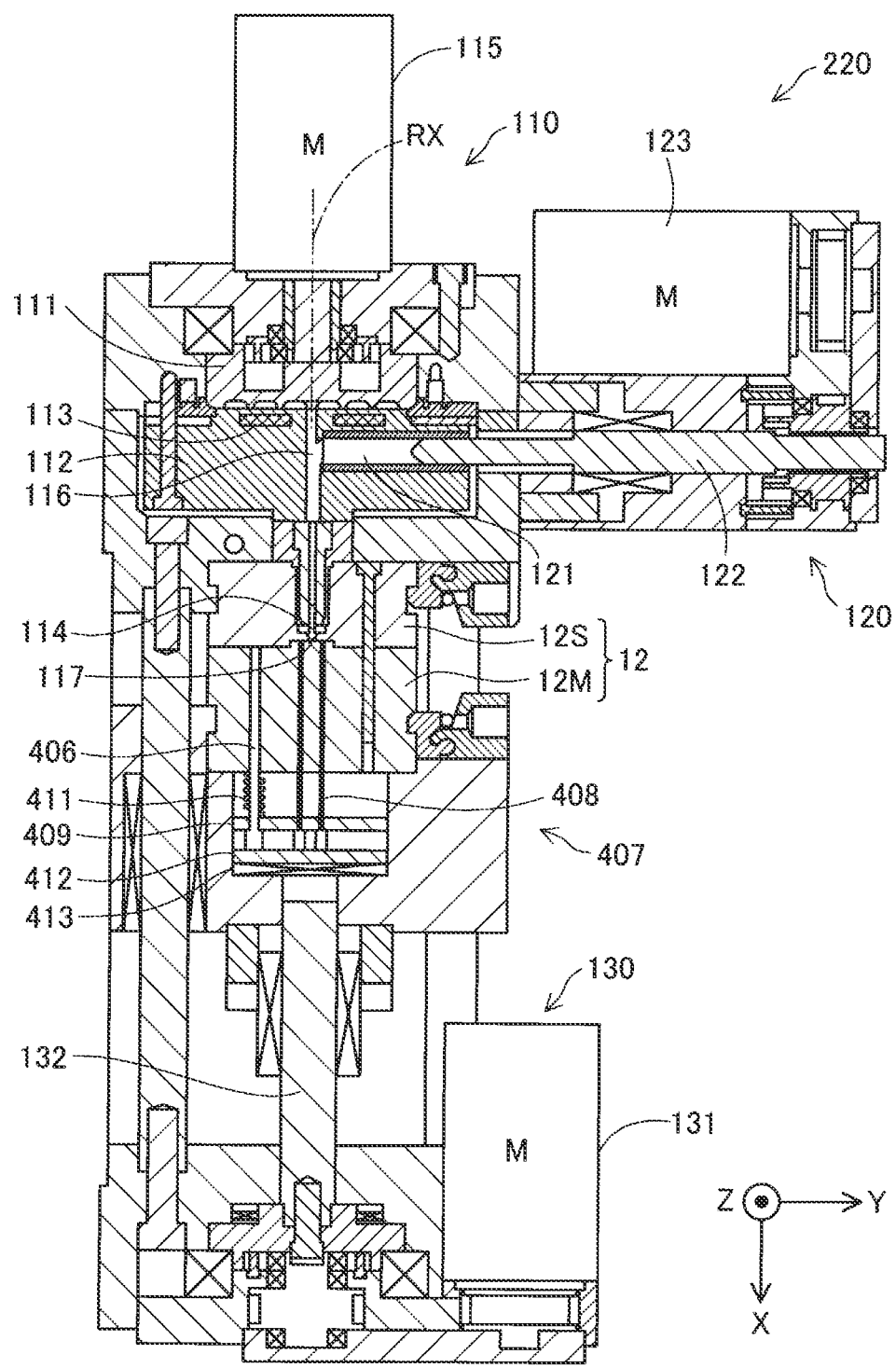
FIG. 3 is an explanatory diagram showing a schematic configuration of an injection molding machine.

FIG. 3 is an explanatory diagram showing a schematic configuration of the injection molding machine 220. The injection molding machine 220 includes a plasticizing device 110, an injection control mechanism 120, the molding die 12, and a mold clamping device 130.

The plasticizing device 110 includes a flat screw 111, a barrel 112, a heater 113, a nozzle 114, and a screw driving section 115. The flat screw 111 is driven to rotate around a rotation axis RX by a screw driving section 115 configured by a motor. A communication hole 116 is formed in the center of the barrel 112. An injection cylinder 121 explained below is coupled to the communication hole 116. The rotation of the flat screw 111 by the screw driving section 115 and heating by the heater 113 are controlled by the controller 230.

Figure 4:
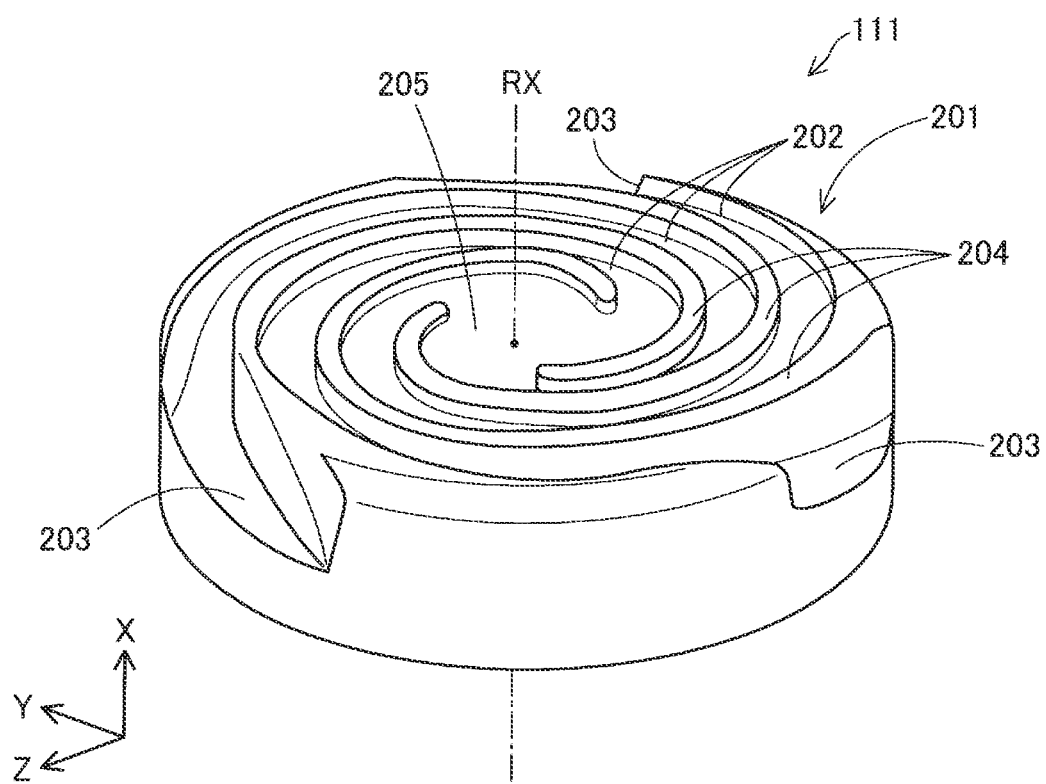
FIG. 4 is a perspective view showing a schematic configuration of a flat screw.

FIG. 4 is a perspective view showing a schematic configuration of the flat screw 111. The flat screw 111 has a substantially columnar shape, the height of which in an axial direction, which is a direction along the center axis of the flat screw 111, is smaller than the diameter thereof. On an end face 201 of the flat screw 111 opposed to the barrel 112, swirl-shaped groove sections 202 are formed centering on a flat center section 205. The groove sections 202 communicate with a material depositing port 203 formed on a side surface of the flat screw 111. The material supplied from the hopper 11 is supplied to the groove sections 202 through the material depositing port 203. The groove sections 202 are formed by being partitioned by convex ridge sections 204. In FIG. 4, an example in which three groove sections 202 are formed is shown. However, the number of the groove sections 202 may be one or may be two or more. The groove sections 202 are not limited to the swirl shape and may have a spiral shape, may have an involute curve shape, or may have a shape extending to draw an arc from the center toward the outer circumference.

Figure 5:
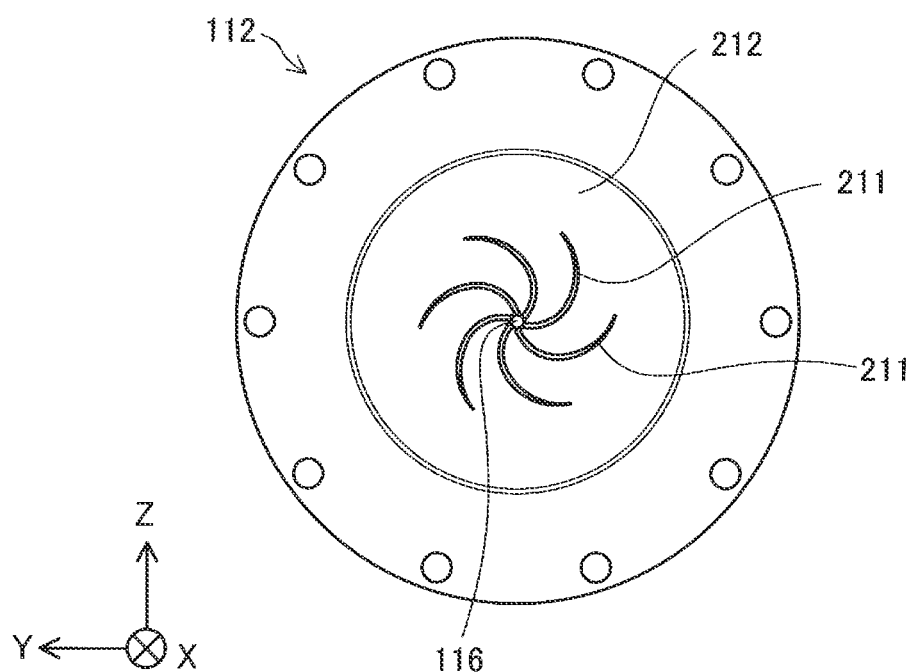
FIG. 5 is a schematic plan view of a barrel.

FIG. 5 is a schematic plan view of the barrel 112. The barrel 112 has an opposed surface 212 opposed to the end face 201 of the flat screw 111. The communication hole 116 is formed in the center of the opposed surface 212. A plurality of guide grooves 211 coupled to the communication hole 116 and extending in a swirl shape from the communication hole 116 toward the outer circumference are formed on the opposed surface 212. The material supplied to the groove sections 202 of the flat screw 111 flows along the groove sections 202 and the guide grooves 211 according to rotation of the flat screw 111 while being melted between the flat screw 111 and the barrel 112 by the rotation of the flat screw 111 and the heating by the heater 113 and is guided to the center section 205 of the flat screw 111. The material flowing into the center section 205 is guided from the communication hole 116 provided in the center of the barrel 112 to the injection control mechanism 120. The guide grooves 211 may not be provided in the barrel 112.

As shown in FIG. 3, the injection control mechanism 120 includes an injection cylinder 121, a plunger 122, and a plunger driving section 123. The injection control mechanism 120 has a function of ejecting and injecting a melted material in the injection cylinder 121 into a cavity 117 explained below. The injection control mechanism 120 controls an ejection amount of the melted material from the nozzle 114 under the control of the controller 230. The injection cylinder 121 is a substantially cylindrical member coupled to the communication hole 116 of the barrel 112 and includes the plunger 122 on the inside. The plunger 122 slides on the inside of the injection cylinder 121 and pressure-feeds the melted material in the injection cylinder 121 to the nozzle 114 included in the plasticizing device 110. The plunger 122 is driven by the plunger driving section 123 configured by a motor.

In this embodiment, the nozzle 114 is configured as a hot runner nozzle. A heater is disposed around the nozzle 114. The hot runner controller 530 controls the heater, whereby the temperature of the nozzle 114 is adjusted.

The molding die 12 includes the movable die 12M and the stationary die 12S. The movable die 12M and the stationary die 12S are provided to face each other. The molding die 12 includes a cavity 117, which is a space corresponding to a shape of a molded article, between the movable die 12M and the stationary die 12S. The melted material is pressure-fed to the cavity 117 by the injection control mechanism 120 and ejected from the nozzle 114.

The mold clamping device 130 includes a molding-die driving section 131 and has a function of opening and closing the movable die 12M and the stationary die 12S. The mold clamping device 130 drives, under the control of the controller 230, the molding-die driving section 131 configured by a motor to thereby rotate a ball screw 132 and moves the movable die 12M combined with the ball screw 132 with respect to the stationary die 12S to open and close the molding die 12. That is, the stationary die 12S is standing still in the injection molding system 100. The movable die 12M moves relatively to the standing-still stationary die 12S, whereby the molding die 12 is opened and closed.

In a state in which the molding die 12 is attached to the injection molding machine 220, an extrusion mechanism 407 for releasing a molded article from the molding die 12 is provided in the movable die 12M. The extrusion mechanism 407 includes an ejector pin 408, a supporting plate 409, a supporting bar 406, a spring 411, an extrusion plate 412, and a thrust bearing 413.

The ejector pin 408 is a bar-like member for extruding a molded article molded in the cavity 117. The ejector pin 408 is provided to pierce through the movable die 12M to be inserted into the cavity 17. The supporting plate 409 is a plate member that supports the ejector pin 408. The ejector pin 408 is fixed to the supporting plate 409. The supporting bar 406 is fixed to the supporting plate 409 and inserted into a through-hole formed in the movable die 12M. The spring 411 is disposed in a space between the movable die 12M and the supporting plate 409 and inserted into the supporting bar 406. During molding, the spring 411 urges the supporting plate 409 such that the head of the ejector pin 408 forms apart of a wall surface of the cavity 117. The extrusion plate 412 is fixed to the supporting plate 409. The thrust bearing 413 is attached to the extrusion plate 412 and provided such that the head of the ball screw 132 does not scratch the extrusion plate 412. A thrust slide bearing or the like may be used instead of the thrust bearing 413.

Figure 6:
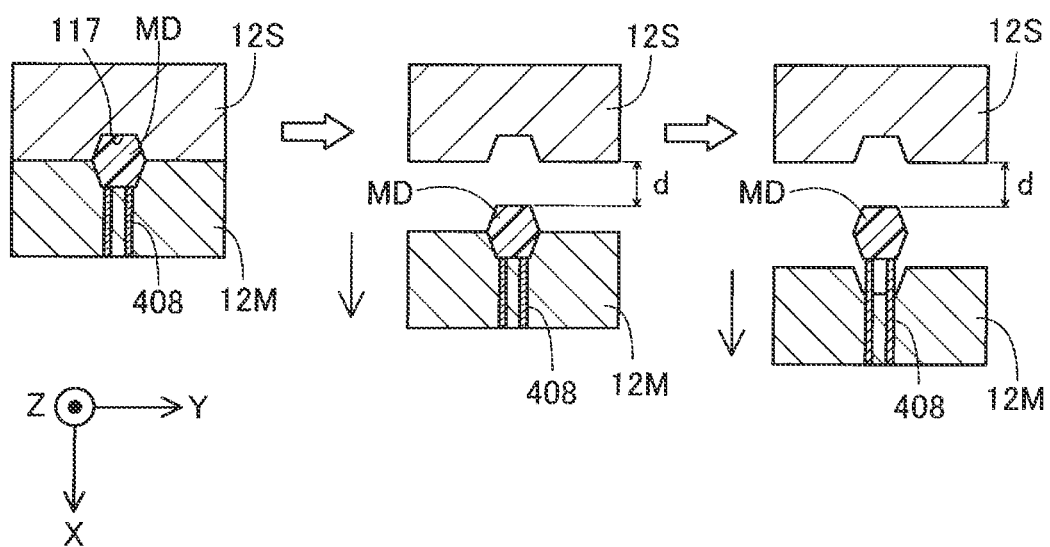
FIG. 6 is an explanatory diagram showing movement of a molding die.

FIG. 6 is an explanatory diagram showing movement of the molding die 12. When the mold clamping device 130 shown in FIG. 3 drives the ball screw 132 and moves the movable die 12M in the +X direction by a predetermined distance with respect to the stationary die 12S as shown in FIG. 6, the end portion on the −X-direction side of the ball screw 132 comes into contact with the thrust bearing 413. The ejector pin 408 does not further move in the +X direction. When the movable die 12M is further moved in the +X direction in that state, only the movable die 12M moves in the +X direction in a state in which the ejector pin 408 is in contact with a molded article MD. Therefore, the ejector pin 408 relatively extrudes the molded article MD in the cavity 117. The molded article MD is released from the movable die 12M. That is, in this embodiment, the ejector pin 408 itself is not moved or projected. The molded article MD is released from the movable die 12M in a position where the molded article MD is standing still. The taking-out device 240 takes out, from the injection molding machine 220, the molded article MD released in this way.

With the injection molding system 100 in this embodiment explained above, the option unit 300, in which the various devices are disposed, can be detachably attached to the first unit 200, in which the injection molding machine 220 is disposed. Therefore, it is possible to, while improving flexibility of customization of the injection molding system 100, realize further space saving than when the units or the devices are separately set.

In this embodiment, the second unit 400, in which the robot 420 that moves a molded article is disposed, is disposed on the +X-direction side of the first unit 200. As shown in FIG. 2, in a state in which the molding die 12 is attached to the injection molding machine 220, the movable die 12M, from which the molded article is released, is located on the +X-direction side of the stationary die 12S. Therefore, the distance between the second unit 400 and the movable die 12M is shorter than the distance between the second unit 400 and the stationary die 12S. With such a configuration, since the distance between the robot 420 and the movable die 12M, from which the molded article is released, is short, it is possible to efficiently move, with the robot 420, the molded article released from the movable die 12M irrespective of presence or absence of the taking-out device 240 and the transporting device 250.

In this embodiment, the third unit 500, in which the material supply device 520 that supplies the material to the injection molding machine 220 is disposed, is disposed on the −X-direction side of the first unit 200. As shown in FIG. 2, in a state in which the molding die 12 is attached to the injection molding machine 220, the stationary die 12S, through the inside of which the nozzle 114 that ejects the material is inserted, is located on the −X-direction side with respect to the movable die 12M. Therefore, the distance between the third unit 500 and the stationary die 12S is shorter than the distance between the third unit 500 and the movable die 12M. With such a configuration, it is possible to efficiently supply the material from the material supply device 520 to the injection molding machine 220, more specifically, from the material supply device 520 to the hopper 11 communicating with the plasticizing device 110 to which the stationary die 12S is coupled.

In this embodiment, a molded article is taken out from the injection molding machine 220 not by the robot 420 but by the taking-out device 240. The taken-out molded article is transported to the vicinity of the robot 420 by the transporting device 250. Therefore, since the different devices can share the taking-out of the molded article and the movement of the molded article to the inspection unit 430, it is possible to reduce a cycle time.

In this embodiment, the second unit 400 includes the inspection unit 430 that inspects a molded article. The robot 420 moves the molded article from the first unit 200 to the inspection unit 430. Accordingly, the injection molding system 100 can perform not only molding of the molded article but also inspection of the molded article. Further, in this embodiment, since the robot 420 disposes, on the tray, only a molded article determined as normal by the inspection unit 430, it is possible to reduce a period from manufacturing to shipment.

In this embodiment, in the first unit 200, since the injection molding machine 220 and the controller 230 that controls the injection molding machine 220 are disposed side by side in the vertical direction, it is possible to realize space saving of the injection molding system 100. In particular, in this embodiment, since the controller 230 is disposed below the injection molding machine 220, the controller 230 is less easily affected by heat generation of the injection molding machine 220.

In this embodiment, since the heat medium temperature controller 540 is included in the third unit 500, it is unnecessary to receive supply of a cooled heat medium from the outside. Accordingly, it is possible to improve setting flexibility of the injection molding system 100.

In this embodiment, since the material is melted using the flat screw 111, it is possible to reduce the injection molding machine 220 in size. Accordingly, it is possible to configure the injection molding system 100 compact.

In this embodiment, as shown in FIG. 6, the ejector pin 408 is projected from the movable die 12M toward the stationary die 12S by moving the movable die 12M in the +X direction relatively to the stationary die 12S. In contrast, in a comparative example shown in FIG. 7, the movable die 12M is moved in the +X direction by a predetermined distance with respect to the stationary die 12S and, thereafter, the movable die 12M is stopped and the ejector pin 408 itself is moved in the −X direction. Accordingly, in the comparative example, the molded article MD moves together with the ejector pin 408. A distance d2 between the stationary die 12S and the molded article MD during release is shorter than a distance d between the stationary die 12S and the molded article MD before the movement of the ejector pin 408 in the −X direction. That is, when the ejector pin 408 itself is moved, it is highly likely that a position where the molded article MD is released fluctuates in every molding. However, in this embodiment, as shown in FIG. 6, the release is performed by moving not the ejector pin 408 but the movable die 12M. Therefore, it is possible to release the molded article MD from the movable die 12M without changing the distance d between the stationary die 12S and the molded article MD before and after the release. Accordingly, it is possible to cause the taking-out device 240 to accurately take out the molded article MD.

B. Other Embodiments (B-1) In the embodiment, the devices included in the first housing 210, the second housing 410, or the third housing 510 may be disposed to be suspended from a supporting body provided near the ceiling of the injection molding system 100. For example, the robot 420 may be disposed not on the second housing 410 but to be suspended above the second housing 410 in the second unit 400. For example, the hot runner controller 530 may be disposed not in the third housing 510 but above the third housing 510 in the third unit 500.

(B-2) In the embodiment, the molding die temperature controller 235 is included in the first unit 200. However, the molding die temperature controller 235 may be included in the third unit 500. One of the molding die temperature controller 235 and the heat medium temperature controller 540 may be included or the molding die temperature controller 235 and the heat medium temperature controller 540 may be an integrated device as a temperature adjusting device.

(B-3) In the embodiment, a part or all of the taking-out device 240, the transporting device 250, and the gate cut device 260 may not be included in the first unit 200. The robot 420 included in the second unit 400 may directly take out a molded article from the injection molding machine 220 and move the molded article.

(B-4) In the embodiment, one or both of the inspection unit 430 and the stacking mechanism 440 may not be included in the second unit 400.

(B-5) In the embodiment, the material supply device 520 included in the third unit 500 may include only one of the material dryer 521 and the material supply section 522. For example, when the material supply device 520 includes only the material dryer 521, the material supply section 522 may be provided on the outside of the first unit 200 or the injection molding system 100. When the material supply device 520 includes only the material supply section 522, the material dryer 521 may be provided on the outside of the first unit 200 or the injection molding system 100.

(B-6) In the embodiment, one or both of the hot runner controller 530 and the heat medium temperature controller 540 may not be included in the third unit 500.

Figure 7:
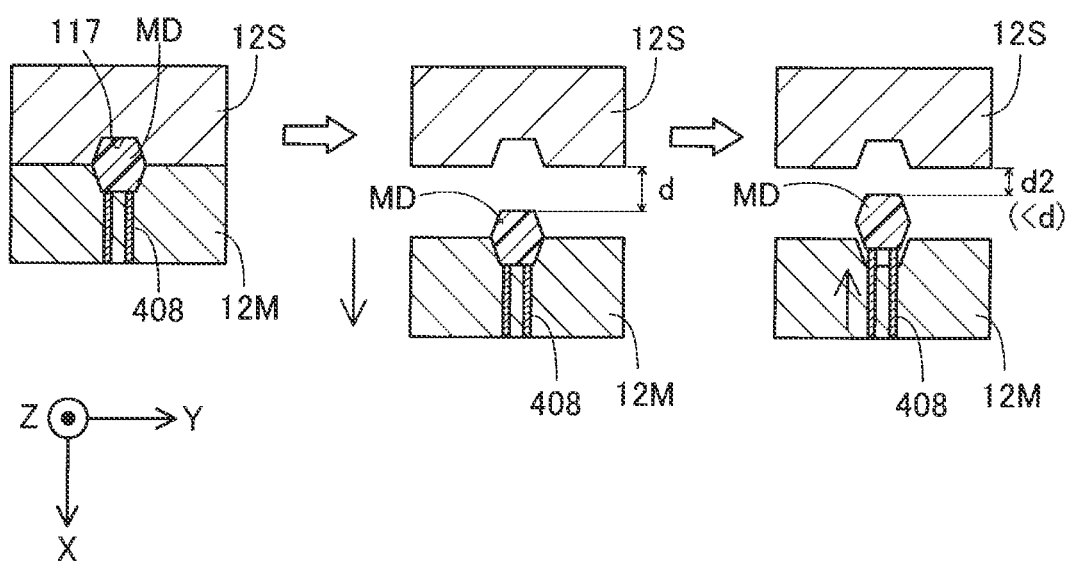
FIG. 7 is an explanatory diagram showing movement of a molding die in a comparative example.

(B-7) In the embodiment, the injection molding machine 220 moves the movable die 12M to thereby project the ejector pin 408 from the movable die 12M toward the stationary die 12S. In contrast, as shown in FIG. 7, the injection molding machine 220 may move the ejector pin 408 itself to thereby project the ejector pin 408 from the movable die 12M.

(B-8) In the embodiment, the plasticizing device 110 included in the injection molding machine 220 performs plasticizing of a material using the flat screw 111. In contrast, the plasticizing device 110 may perform plasticizing of a material using an inline screw.

(B-9) In the embodiment, cooling fans for cooling the motors included in the injection molding machine 220 may be attached to the motors.

(B-10) In the embodiment, the taking-out device 240 may be configured by a robot. The transporting device 250 may also be configured by a robot. The taking-out device 240 and the transporting device 250 may be replaced with one robot including the functions of the taking-out device 240 and the transporting device 250.

(B-11) In the embodiment, a plurality of the devices may be provided for one injection molding machine 220. For example, if a plurality of inspection units 430 are provided for one injection molding machine 220, it is possible to reduce a time required for inspection and reduce a cycle time.

(B-12) In the embodiment, the option unit 300 includes the second unit 400 and the third unit 500. In contrast, the option unit 300 may include only one of the second unit 400 and the third unit 500 or may include a larger number of units. The units are not limited to be disposed side by side in one row and may be disposed in an L shape, a cross shape, or a rectangular shape when viewed from the Z direction.

C. Other Aspects

The present disclosure is not limited to the embodiments explained above and can be realized in various configurations without departing from the gist of the present disclosure. For example, technical features of the embodiments corresponding to technical features in aspects described below can be substituted or combined as appropriate in order to solve a part or all of the problems described above or in order to achieve a part or all of the effects described above. The technical features can be deleted as appropriate unless the technical features are explained as essential technical features in this specification.

(1) According to a first aspect of the present disclosure, an injection molding system is provided. The injection molding system includes: a first unit in which an injection molding machine is disposed; and an option unit. The injection molding machine is configured to be attachable with a stationary die and a movable die that moves with respect to the stationary die. The option unit includes at least one of: a second unit in which a robot that moves a molded article molded by the injection molding machine is disposed; and a third unit in which at least one of a material dryer that dries a material supplied to the injection molding machine and a material supply section that supplies the material to the injection molding machine is disposed. The first unit is configured to be detachably attachable with the option unit.

According to such an aspect, the option unit in which the robot, the material dryer the material supply section, and the like are disposed can be detachably attached to the first unit in which the injection molding machine is disposed. Therefore, it is possible to, while improving flexibility of customization of the injection molding system, realize further space saving than when the units or the devices are separately set.

(2) In the aspect, the option unit may include the second unit, and, in a state in which the stationary die and the movable die are attached to the injection molding machine, a distance between the second unit and the movable die may be shorter than a distance between the second unit and the stationary die. According to such an aspect, it is possible to efficiently move, with the robot included in the second unit, a molded article released from the movable die.

(3) In the aspect, the option unit may include the third unit, and, in a state in which the stationary die and the movable die are attached to the injection molding machine, a distance between the third unit and the stationary die may be shorter than a distance between the third unit and the movable die. According to such an aspect, it is possible to efficiently supply the material from the material dryer and the material supply section included in the third unit to the injection molding machine.

(4) In the aspect, the first unit may include: a taking-out device configured to take out the molded article from the injection molding machine; and a transporting device configured to transport the molded article taken out by the taking-out device. The robot disposed in the second unit may move the molded article transported by the transporting device. According to such an aspect, since the taking-out and the movement of the molded article can be shared by the different devices, it is possible to reduce a cycle time.

(5) In the aspect, the option unit may include the second unit, the second unit may include an inspection unit configured to inspect the molded article, and the robot may move the molded article from the first unit to the inspection unit. According to such an aspect, in the injection molding system, it is possible to perform not only the molding of the molded article but also the inspection of the molded article.

(6) In the aspect, in the first unit, the injection molding machine and a controller that controls the injection molding machine may be disposed side by side in a vertical direction. According to such an aspect, it is possible to realize further space saving of the injection molding system.

(7) In the aspect, the option unit may include the third unit, and the third unit may include a temperature controller for adjusting temperature of a molding die included in the injection molding machine. According to such an aspect, it is possible to improve setting flexibility of the injection molding system.

(8) In the aspect, the injection molding machine may include an ejector pin configured to, in a state in which the stationary die and the movable die are attached to the injection molding machine, project from the movable die toward the stationary die according to the movement of the movable die to thereby extrude the molded article from the movable die. According to such an aspect, since the ejector pin projects from the movable die toward the stationary die according to the movement of the movable die, it is possible to release the molded article from the movable die without changing a position of the molded article.

What is claimed is:

1. An injection molding system comprising:
   a first unit in which an injection molding machine is disposed; and
   an option unit, wherein
   the injection molding machine is configured to be attachable with a stationary die and a movable die that moves with respect to the stationary die,
   the option unit includes:
      a second unit in which a robot that moves a molded article molded by the injection molding machine is disposed; and
      a third unit in which at least one of a material dryer is configured to dry a material supplied to the injection molding machine and a material supply section that supplies the material to the injection molding machine is disposed, and
   the first unit is configured to be detachably attachable with the option unit.

2. The injection molding system according to claim 1, wherein
   the option unit includes the second unit, and
   in a state in which the stationary die and the movable die are attached to the injection molding machine, a distance between the second unit and the movable die is shorter than a distance between the second unit and the stationary die.

3. The injection molding system according to claim 1, wherein
   the option unit includes the third unit, and
   in a state in which the stationary die and the movable die are attached to the injection molding machine, a distance between the third unit and the stationary die is shorter than a distance between the third unit and the movable die.

4. The injection molding system according to claim 1, wherein
   the first unit includes:
      a taking-out device configured to take out the molded article from the injection molding machine; and
      a transporting device configured to transport the molded article taken out by the taking-out device, and
   the robot disposed in the second unit moves the molded article transported by the transporting device.

5. The injection molding system according to claim 1, wherein
   the option unit includes the second unit,
   the second unit includes an inspection unit configured to inspect the molded article, and
   the robot moves the molded article from the first unit to the inspection unit.

6. The injection molding system according to claim 1, wherein, in the first unit, the injection molding machine and a controller that controls the injection molding machine are disposed side by side in a vertical direction.

7. The injection molding system according to claim 1, wherein
   the option unit includes the third unit, and
   the third unit includes a temperature controller for adjusting temperature of a molding die included in the injection molding machine.

8. The injection molding system according to claim 1, wherein the injection molding machine includes an ejector pin configured to, in a state in which the stationary die and the movable die are attached to the injection molding machine, project from the movable die toward the stationary die according to the movement of the movable die to thereby extrude the molded article from the movable die.

9. The injection molding system according to claim 1, wherein
   the material supply unit supplies the material from the material dryer to the injection molding machine.

10. The injection molding system according to claim 1, wherein
    a position of the second unit is in relation to the first unit is fixed by a stopper extending downwardly from a bottom portion of the second unit and a coupling plate-like member extending between the first unit and the second unit and between the robot and a stacking mechanism for the second unit.

11. The injection molding system according to claim 1, further comprising:
    a first controller and a second controller disposed in the first unit, the first controller being configured to control the injection molding machine,
    the injection molding machine being configured to be attachable with a molding die having a stationary die and a movable die that moves with respect to the stationary die, the second controller being configured to control a heat medium circulating to the molding die, and
    the third unit comprising a hot runner controller configured to adjust a temperature of a nozzle of the injection molding machine and a heat medium temperature controller configured to cool the head medium circulating to the molding die.

* * * * *